Patented Aug. 6, 1940

2,210,838

UNITED STATES PATENT OFFICE 2,210,838

METHOD OF PREVENTING UNDESIRED POLYMERIZATION OF VINYL-METHYL-KETONE

Heinrich Lange and Otto Horn, Frankfort-on-the-Main-Hochst, Germany, assignors to I. G. Farbenindustrie Aktiengesellschaft, Frankfort-on-the-Main, Germany No Drawing. Application January 15, 1938, Serial No. 185,156. In Germany January 19, 1937

4 Claims. (Cl. 202—57)

The present invention relates to a method of preventing undesired polymerization of vinyl-methyl-ketone.

Vinyl-methyl-ketone is obtained during its manufacture from vinyl-acetylene in the form of a mixture of vinyl-methyl-ketone and vinyl-acetylene. The constituents of this mixture can be separated only by fractional distillation under reduced pressure, because during distillation under atmospheric pressure the ketone shows a very strong tendency to polymerization. Pure vinyl-methyl-ketone behaves similarly during distillation under atmospheric pressure.

The distillation of mixtures of vinyl-methyl-ketone and hydrocarbon under reduced pressure is very undesirable, particularly on a large scale, because precautions must be taken to avoid the production of explosive mixtures of vinyl-acetylene and air or peroxides. Furthermore, a complete separation of the compounds under reduced pressure is not practicable.

We have found that vinyl-methyl-ketone and hydrocarbon may be separated from each other, or vinyl-methyl-ketone itself may be distilled, in a very simple and ready manner under atmospheric pressure if care be taken that the pH-value of the mixture or of the vinyl-methyl-ketone to be distilled is maintained below 7.1, i. e. that the operation is conducted in the acid sphere. The acid pH-value may be adjusted by an acid, preferably by an organic acid. Whereas the distillation of the ketone with application of this knowledge leaves a residue, according to how much the pH-value is below 7.1, of 2 per cent. to 3 per cent., the residue increases to 13 per cent. when the pH-value is 7.3. When the pH-value is higher than 7.3 the residue further increases. In the more strongly alkaline sphere no distillation is possible because, on heating the ketone, it instantly polymerizes to a viscous to solid mass.

When stored at room temperatures, vinyl-methyl-ketone polymerizes slowly to form a viscous oil and finally a viscous, transparent and solid mass. We have found that this phenomenon may be avoided if the pH-value is maintained in the acid sphere, that is below 7.1. Furthermore a stabilizing agent such as hydroquinone, or a copper salt may be added.

For adjusting to the desired pH-value we prefer to employ an acid which is soluble in water and in vinyl-methyl-ketone, for instance an aliphatic carboxylic acid of low molecular weight such as acetic acid, formic acid, propionic acid; furthermore butyric acid, glycolic acid.

The following examples serve to illustrate the invention, but they are not intended to limit it thereto; the parts are by weight:

(1) 100 parts of vinyl-methyl-ketone (pH= 5.4) are distilled under atmospheric pressure in a column packed with rings. The yield of pure vinyl-methyl-ketone is 98 per cent. The polymerization residue is 1.7 per cent.

(2) 100 parts of vinyl-methyl-ketone (pH= 6.6) are distilled under atmospheric pressure in a column packed with rings. The yield of pure vinyl-methyl-ketone is 97 per cent. The polymerization residue is 2 per cent.

(3) 100 parts of vinyl-methyl-ketone (pH= 7.3) are distilled under atmospheric pressure in a column packed with rings. The yield of pure vinyl-methyl-ketone is 86 per cent. The polymerization residue is 13 per cent.

(4) 100 parts of vinyl-methyl-ketone (pH= 7.3) (see Example 3) are rendered acid (pH=5.0) by means of acetic acid and distilled under atmospheric pressure in a column packed with rings. The yield of pure vinyl-methyl-ketone is 95 per cent. The polymerization residue is 3.5 per cent.

(5) 100 parts of a mixture (pH=4.8) of vinyl-methyl-ketone and vinyl-acetylene containing 25 per cent. of vinyl-acetylene are continuously introduced into a column heated to 80° C. and provided with an inlet at the middle, and the mixture is separated in this column into vinyl-methyl-ketone and vinyl-acetylene. While the ketone (96 per cent. of ketone, 4 per cent. of water and 0.05 per cent. of vinyl-acetylene) is caused to run into the receiver, the vinyl-acetylene passes by way of the top condenser into the vinyl-acetylene collector. The polymerization residue of the ketone obtained during the distillation under atmospheric pressure is 2.5 per cent.

We claim:

1. A method of preventing undesired polymerization of vinyl-methyl-ketone which comprises maintaining the ketone at a pH-value of less than 7.1 by adding a lower aliphatic carboxylic acid soluble in water and in vinyl-methyl-ketone.

2. A method of preventing undesired polymerization of vinyl-methyl-ketone during the distillation of materials comprising same, which comprises maintaining said materials at a pH value of less than 7.1 throughout the distillation by adding a lower aliphatic carboxylic acid soluble in water and in vinyl-methyl-ketone.

3. A method of preventing undesired polymerization of vinyl-methyl-ketone during the distillation thereof, which comprises maintaining the vinyl-methyl-ketone at a pH value of less than 7.1 throughout the distillation by adding a lower aliphatic carboxylic acid soluble in water and in vinyl-methyl-ketone.

4. A method of preventing undesired polymerization of vinyl-methyl-ketone during storage thereof, which comprises maintaining the vinyl-methyl-ketone at a pH value of less than 7.1 throughout the storage by adding a lower aliphatic carboxylic acid soluble in water and in vinyl-methyl-ketone.

HEINRICH LANGE.
OTTO HORN.